United States Patent Office 3,274,086
Patented Sept. 20, 1966

3,274,086
IRRADIATED RUBBERY ELASTOMERIC ETHYL-
ENE-ALKYL ACRYLATE INTERPOLYMERS
James E. Potts, Millington, N.J., assignor to Union Carbide Corporation, a corporation of New York
No Drawing. Filed June 29, 1962, Ser. No. 206,148
9 Claims. (Cl. 204—159.14)

This invention relates to synthetic rubbery copolymers and more particularly to rubbery copolymers of an ethylene-alkyl acrylate copolymer having superior physical properties to the ethylene-alkyl acrylate copolymers heretofore available which are useful as rubber substitutes. The invention is further directed to such copolymers having large amounts inert fillers present.

Copolymers of ethylene and alkyl esters of acrylic acid are well known in the art as are processes for producing these copolymers. In certain properties these copolymers are superior to polyethylene and other known ethylene copolymers particularly in impact strength, tensile strength, ultimate elongation and ease of extrusion, i.e. lower softening temperatures and resistance to skinning and delamination.

However, in other properties these copolymers leave something to be desired. The copolymers have a much lower crystallinity than does polyethylene and for the most part are completely amorphous, thus substantially lowering the use temperatures of the copolymer. In addition, as the amount of alkyl acrylate in the copolymer increases, not only does the polymer have lower softening temperatures but also the chain transfer effects caused by the alkyl acrylate result in a lower molecular weight. This substantial decrease in molecular weight of the copolymers has to some extent been corrected by decreasing the catalyst concentration in the feed, but unfortunately this results in a substantial decrease in the resultant conversion of the monomers to copolymer.

This problem becomes more serious with increasing acrylate content in the polymerization zone so that heretofore in a tubular reactor system, for example, it has not been possible to prepare an ethylene-alkyl acrylate copolymer having 15 percent or more combined alkyl acrylate with a melt index below about 5, and with those copolymers having only 5 percent combined alkyl acrylate it is nearly impossible to produce a copolymer of a melt index of less than 1.0. Consequently, the performance normally achieved with other ethylene polymers has not been possible with the ethylene-alkyl acrylate copolymers. Low melt index resins, such as those of 0.01 to 0.20 are generally necessary for many applications such as film orientation, cable and wire coatings, and other highly desirable applications where tensile and impact strengths and ultimate elongation of a high order are more preferred.

Ethylene-alkyl acrylate copolymers containing from 15 to 40 weight percent of ethyl acrylate have characteristics akin to rubbers and natural elastomers but because of the aforementioned melt index limitation, presently available products do not have satisfactory ultimate tensile strength, yield strength, and elongation for commercial use as rubber gum stocks and like uses. Further, because of the thermoplastic nature of the copolymers, they are lacking in elastic recovery and infusibility, two important characteristics of commercial rubbers. Because of this, it is not possible to load these copolymers with substantial quantities of inert fillers such as carbon black to expand their possible use as rubber replacements.

Films of commercially available ethylene-alkyl acrylate copolymers show a decrease in solvent resistance and stiffness with corresponding increases in acrylate content. When such films are formed by extrusion, an increase in acrylate content also produces an increase in optical haze level, as well as a decrease in surface gloss.

Thus, in many respects the presently available ethylene-alkyl acrylate polymers leave much to be desired.

It is therefore an object of this invention to provide an ethylene-alkyl acrylate copolymer having a use temperature in the range of that for polyethylene.

It is another object of this invention to provide an ethylene-alkyl acrylate copolymer having a melt index substantially less than one decigram per minute.

It is a further object of this invention to provide an ethylene-alkyl acrylate copolymer having rubber-like physical characteristics, and useful in the fields of applicability now limited to rubbers.

Still another object of this invention is to provide a film of ethylene-alkyl acrylate copolymer having good solvent resistance and stiffness as well as low optical haze and high surface gloss regardless of the mode of fabrication.

A still further object of this invention is to provide a process for the improvement of properties of ethylene-alkyl acrylate copolymer resins, particularly in the highly filled compositions to make them suitable substitutes for rubbers.

Other objects of this invention will be apparent from the subsequent disclosure and appended claims.

These and other objects are achieved by the present invention through which it is now possible to make high molecular weight, low melt index ethylene-alkyl acrylate copolymers containing up to about 40 weight percent alkyl acrylate polymerized therein, which copolymers have superior tensile strength, elongation, elastic recovery and elevated temperature resistance. The copolymers produced herein can be tailored to have any desired melt index or other combination of such properties depending upon the ultimate or desired end use of the copolymer. By the use of the present invention, it is now possible to produce ethylene-alkyl acrylate copolymers useful as rubber substitutes. As a more desirable embodiment of the present compositions, it has now been discovered that they can be highly loaded with inert fillers to yield tough elastomeric abrasion resistant rubber substitutes of excellent physical properties.

These desirable results, it has been discovered, are secured by exposing an ethylene-alkyl acrylate interpolymer to ionizing radiation in amounts from about 0.5 to 50 megareps, and depending upon the melt index of the starting copolymer, uniform products characterized by having a melt index less than 1 decigram per minute are thereby produced. Films produced from these copolymers are self-supporting and may be biaxially oriented. The polymers characterized by having an optical density per mil thickness of 0.28 or less at $13.7\mu$ in the infrared spectrum are truly elastomeric and are suitably employed as rubber stocks. These polymers also are now characterized by having a use temperature equivalent to polyethylene and superior to most other ethylene copolymers in all physical properties. Copolymers of ethylene and alkyl acrylates are by the present invention, made commercially useful for applications where the presently available copolymers cannot be used.

As employed herein, the term "alkyl acrylate" is intended to cover the alkyl esters of acrylic acid having in the alkyl moiety, groups having up to about 12 carbon atoms. It is preferred in the practice of this invention to utilize polymers made from the more simple acrylates, such a methyl acrylate, ethyl acrylate, propyl acrylate, butyl acrylate and like acrylates having from 1 to 6 carbon atoms in the alkyl group.

It is further intended that the term "interpolymer" as used herein will include any copolymer, terpolymer, quadripolymer or other polymer, the constitutents of such polymers being derived from the use of a multiplicity of alkyl acrylates copolymerized with each other and with ethylene. This term is further defined as including copolymers having a small or minor amount of a constituent therein other than alkyl acrylate or ethylene which may or may not be copolymerizable therewith but which in any case will not substantially change the physical properties of the resulting copolymer at least insofar as molecular weight and crystallinity are concerned, such as for instance, propylene, styrene, acrylic and methacrylic acid, butadiene and like monomers, as long as the ethylene combined in the copolymer is present in a major amount. The copolymer must also contain from 5 to 40 weight percent of alkyl acrylate polymerized therein. Of greatest interest are those copolymers of ethylene and ethyl or methyl acrylate which contain from about 15 to about 40 weight per cent of the alkyl acrylate combined therewith. Copolymers having 15 to 40 weight percent combined alkyl acrylate and correspondingly a high molecular weight corresponding to a melt index of less than about 0.4 decigram per minute at 190° C. (as measured by A.S.T.M. test D–1238–57T) have not been made heretofore except by costly and very impractical techniques.

Thus there is no critical limitation in the melt index of the starting copolymers other than that inherent in the methods for making them. However, extremely high melt indices of the starting copolymer are not particularly desirable. It is preferable that the copolymers have a melt index of less than about 70.0. Particularly effective results are secured with copolymers having a melt index between 5 and 30, when the ionizing radiation dosage is maintained between about 1 to 30 megareps. However, in the process of this invention the irradiation dosage is not so narrowly limited.

As stated heretofore these desirable results are accomplished by high energy ionizing irradiation in doses from about 0.5 megarep to about 50 megareps, the dose being commensurate with the initial melt index of the copolymer being irradiated and the desired final melt index of the irradiated copolymer. The lower molecular weight polymers as indicated by a high melt index generally require a higher degree of irradiation than those of initial high molecular weight.

Irradiation is effective at temperatures from −80° C. to 200° C. and is preferred between about 0° C. and 100° C. It is most convenient to utilize ambient temperature irradiation, that is, a sample being passed through an irradiation beam at room temperature and the sample temperature is allowed to increase by the action of the irradiation until the desired dose is obtained.

The source of the ionizing radiation employed in this invention is not narrowly critical. While the subsequent examples employ beta radiation (cathode emission) from a Van de Graaff electron accelerator, other sources of high energy electrons can be used. This Van de Graaff apparatus employed here and its operations have been fully described by F. L. Foster et al. in "Nucleonics," October 1953, vol. 11, No. 10, pp. 14–17 (McGraw-Hill Publishing Co., Inc., New York). Such radiation is more properly called cathode radiation when obtained by such electromechanical means. As employed herein, one megarep or one million reps (Roentgen equivalent physical) is that amount of radiation equivalent in energy delivered to $83.8 \times 10^6$ ergs per gram of polymer.

Other sources of high energy electrons (beta-radiation) such as radioactive isotopes and resonant transformer accelerators can be employed, as well as sources of ionizing radiation such as gamma rays, X-rays, protons (hydrogen ions), dueterons (heavy hydrogen ions) or positive ions such as alpha particles. Beta-radiation (high speed electrons) obtained from radioactive isotopes such as strontium 90-yttrium 90 equilibrium mixture can be used with similar results. Gamma rays, that is, electromagnetic radiation similar to light, but covering the wave length range of 0.1 Angstrom unit to 0.001 A.U. may be obtained, for example, from cobalt 60 isotope or from a 2 million volt Van de Graaff electron accelerator equipped with a gold or tungsten target. Alpha particles can be obtained most easily from radio-isotopes such as polonium 210.

It will be apparent that the term "ionizing radiation" as it is used herein is intended to embrace gamma and X-rays as well. These latter rays, while they do not carry an electric charge, do in their passage through the polymer, eject electrons and the latter, being electrically charged, are able to produce the radiation sufficient for use in this invention. X-rays, electromagnetic radiation similar to light but covering the wave-length range of 10 angstrom units (A.U.) to 0.1 A.U. (1 A.U. $-10^{-8}$ cm.) can be obtained directly from an X-ray machine of about one-half million volts or more.

Exposure of the resin of ionizing radiation is best conducted by continuously passing it through the radiation field at a speed such that the residence time in the field is sufficient for the copolymer to absorb the desired dose. Such continuous methods are particularly preferred and are ideally suited to the practice of this invention. However, if desired, exposure can be similarly accomplished in batch or in semi-continuous operations.

It is not particularly critical that the copolymer employed in this process be in any particular form during the exposure of the irradiation. The copolymer can be in pellet or granular form, or as a continuous sheet, film, rod or other formed shape. If desired, the copolymer can be directly irradiated at the outlet of the polymerization reactor. For best results, the polymer preferably should be in a form or exposed under such conditions that all of the polymer will be exposed to the same degree of irradiation and thus localized overexposed and underexposed areas do not occur. Thus, pellets of a size of 1/8" to 1/4" diameter or film or sheet stock of 0.5 mil to 250 mils thick can be used with excellent results in continuous exposure operation with a 2 mev. Van de Graaff electron accelerator as employed herein.

An outstanding advantage of the present invention is that it is now possible to prepare ethylene-alkyl acrylate copolymer rubbers having greatly improved tensile properties, excellent low temperature flexibility, elongation of several hundred percent with excellent recovery characteristics and outstanding resistance to ozone and oxygen attack due to the absence of significant amounts of internal unsaturation. These rubbers are both insoluble and infusible. The presence of large portions of carbon black does not prevent the attainment of these properties. The production of rubber in accordance with this invention is shown in the appended examples.

A further outstanding advantage of this invention is that highly loaded rubbery compositions can be prepared which retain basically the desirable properties of the copolymer in spite of the heavy loading of filler of 30–50 parts filler per 100 parts of copolymer. Especially surprising results are secured with carbon black as the filler. Regular or conventional polyethylene when filled and irradiated in a like manner gives a very weak and brittle product, entirely unlike the copolymers of this invention.

It is also contemplated herein that other fillers such as silica or diatomaceous earth, stabilizers, antioxidants, and colorants, as well as pressing or filming aids as slip and anti-blocking agents and other modifiers can be also included in these compositions to secure results as may be expected.

A preferred method for carrying out the process of the present invention is by the technique employed in the following examples.

The equipment used in radiation treatment consisted of a Van de Graaff electron accelerator, variable in voltage from 500,000 volts minimum to 2.5 million volts maximum and variable in electron beam current from 0.1 microampere to 250 microamperes. Samples of plastic ranging in width from 0.001 inch to 15 inches and ranging in thickness from 0.5 mil to 0.8 inch can be treated with this equipment. Molded plaques and sheets varying in thickness up to 0.8 inch, in width up to 15 inches and in length up to 5 feet were irradiated with electrons by placing the samples on a conveyor belt moving at 40 inches a minute under the ionizing radiation beam.

Pellets and powders were radiation treated by air-conveying the material to an overhead hopper from whence the material is moved by gravity into a vibrating feeder and thence onto a continuous conveyor belt moving under the electron beam. The speed of this belt was variable from 2 to 80 inches per minute.

Rolls of films were irradiated by placing the roll on a film winder, which was placed under the electron beam. The roll of film was irradiated as it was unwound from the roll. The radiation dose was controlled by varying film speed, electron beam current and beam scan width.

Physical properties of the irradiated ethylene-alkyl acrylate copolymers were measured by the following test method:

Vicat softening point—ASTM No. D–1525–58T.
Ultimate tensile strength—ASTM No. D–412–51T.
Percent elongation—ASTM No. D–412–51T.
Gloss—ASTM No. D–523–53T.
Haze—ASTM No. D–1003–52.
Brittle temperature—ASTM No. D–746–44T.
Melt index—ASTM No. D–1238–57T.
Stress cracking—ASTM No. D–1693.
Tensile impact—As reported in Modern Packaging, vol. 32, No. 1 (September 1958), p. 147, by R. H. Carey and M. S. Nutkis.
Secant modulus—Similar to ASTM–D–638 except that specimen cut from die A described in ASTM–D–412 rather than die required in D–638. Calculated as 100 times ratio of load (in pounds at 1% strain) to the arithmetic product of average width and average thickness in inches. Strain point determined from stress-strain plot of automatic recorder.
Shrinkage—As percent shrinkage (average of machine and transverse directions) of film. The specimens were floated on a glycerine bath at specified temperatures in the range 50°–150° C. for 5 minutes. Dimensional measurements were made at room temperature.

By method of the present invention it is possible to make ethylene-ethyl acrylate copolymers having improved high temperature properties without diminishing the good low temperature properties exhibited by presently available ethylene-ethyl acrylate copolymers. This is illustrated by the following examples. Unless otherwise specified all parts and percentages are by weight. All examples showing 0 radiation dose are control experiments and not part of this invention.

EXAMPLE I

Plaques of an ethylene-ethyl acrylate copolymer containing between about 13 and 16 percent ethyl acrylate and having a melt index of 4.5 averaging about ¼" to ⅛" in size were irradiated with 2 million volt electrons using the Van de Graaff accelerator, with the results shown below obtained from sample plaques, 6 inches by 8 inches by 40 mils thick.

| Dose, Megareps | Tensile Impact Strength, p.s.i. | Vicat Softening Point, °C. | Ultimate Tensile Strength, p.s.i. | Percent Ultimate Elongation |
|---|---|---|---|---|
| 0 | 340 | 59.1 | 1,800 | 710 |
| 10 | 494 | 59.7 | 2,400 | 570 |
| 20 | 548 | 65.6 | 2,500 | 490 |

The first and third samples were subjected to heat degradation tests in a forced air oven at 158° C. The first underwent plastic flow and lost its molded shape completely in ½ hour. The third showed no change in dimensions after 4 hours at 158° C. and retained substantially all of its initial physical properties.

EXAMPLE II

An ethylene-ethyl acrylate copolymer containing about 15 weight percent ethyl acrylate and having a melt index of 4.0 was compression molded into plaques 6 inches by 8 inches by 40 mils thick. Samples of the same copolymer was hot-blended at 125° C. with 33 parts of carbon black per 100 parts of copolymer; the mixture was also molded into plaques of the same size. Plaques of the unfilled copolymer plaques and the carbon black filled copolymer were irradiated with two million volt electrons to a radiation dose of 25 megareps. Properties of the filled and unfilled, radiated and unirradiated plaques were compared.

The unirradiated plaques, with or without carbon black melted completely at about 85° C. Irradiation of the unfilled copolymer produced a product having a stiffness (secant modulus at 1 percent elongation) of about 100 p.s.i. up to about 300° C. whereas the black-filled irradiated sample had a stiffness of about 200 p.s.i. at about the same temperature.

EXAMPLE III

An ethylene-ethyl acrylate copolymer containing approximately 35 percent ethyl acrylate and having a melt index of 70.5 was compression molded in plaques 6 inches by 8 inches by 40 mils thick. Additionally the same copolymer was blended with 43 parts of carbon black and 100 parts of carbon black per 100 parts of copolymer and molded into plaques of the same size. Some of the samples were irradiated to a dose of 25 megareps. Some of the unfilled plaques were given a dose of 50 megareps. The results were identical with those of the previous example in that the stiffness was improved at elevated temperature with increasing irradiation dose and with increasing carbon content.

The irradiated copolymer showed a 14 percent hysteresis loss at 25 megareps dose whereas the unirradiated control sample was too soft to be subject to this measurement. The stress-strain curves for the samples showed no adverse effects from irradiation. The results of permanent set tensile strength and percent elongation of the 25 megarep samples are shown in the following table:

| Carbon black parts per 100 parts resin | Radiation dose, megareps | Percent permanent set at 100% elongation | Tensile strength, p.s.i. | Percent elongation |
|---|---|---|---|---|
| 0 | 0 | (¹) | (¹) | (¹) |
| 0 | 25 | 12.8 | 650 | 950 |
| 0 | 50 | 10.7 | 150 | 250 |
| 43 | 25 | 10.5 | 1,550 | 500 |

¹ Sample too soft to measure.

EXAMPLE IV

An ethylene-ethyl acrylate copolymer, containing about 12 percent ethyl acrylate, having an initial melt index of 4.0 was compression molded into plaques 6 inches by 8 inches by 40 mils thick and the plaque irradiated with 2 million volt electrons with the results shown below:

| Dose Megareps | Melt Index, 190° C. | Ultimate Tensile Strength, p.s.i. | Percent Elongation | Brittle temperature, 80° C. |
|---|---|---|---|---|
| 0 | 4 | 1,320 | 830 | −100 |
| 5 | 0.017 | 2,124 | 740 | −105 |
| 10 | 0.0 | 2,227 | 659 | −105 |
| 25 | 0.0 | 2,587 | 500 | −105 |

Other data pertaining to irradiated, unfilled ethylene-ethyl acrylate copolymers are given below. These prove that radiation increases the tensile strength and impact strength of ethylene-ethyl acrylate copolymers.

To further show the advantageous effect of irradiation on tensile strength and impact strength of the copolymers, the foregoing tests were reported for several unfilled irradiated copolymer compositions. For example, when ethylene-ethyl acrylate copolymers having a melt index of 26.5 produced from a comonomer feed containing 1.0 mole percent ethyl acrylate and about 20 percent by weight ethyl acrylate polymerized therein was irradiated the following results were obtained.

| Radiation Dose, megareps | Ultimate Tensile | Percent Elongation | Tensile Impact, foot-pounds per inch [3] | Brittleness Temperature, °C. |
|---|---|---|---|---|
| 0 | 458 | 755 | 257 | <−80 |
| 5 | 713 | 820 | 350 | <−80 |
| 10 | 1,242 | 875 | 431 | <−80 |
| 25 | 1,550 | 750 | 588 | <−80 |

Similarly, for a copolymer having a melt index of 47.5 produced from a comonomer feed containing 1.24 mole percent ethyl acrylate and containing about 25 percent by weight ethyl acrylate in the copolymer, the results are:

| Radiation Dose, megareps | Ultimate Tensile | Percent Elongation | Tensile Impact, foot-pounds per inch [3] | Brittleness Temperature, °C. |
|---|---|---|---|---|
| 0 | 161 | 500 | 172 | <−80 |
| 5 | 203 | 690 | 234 | <−80 |
| 10 | 391 | 880 | 310 | <−80 |
| 25 | 830 | 620 | 381 | <−80 |

Similarly, for a copolymer having a melt index of 70 produced from a comonomer feed containing 1.87 mole percent ethyl acrylate, containing about 33% by weight of ethyl acrylate in the copolymer, the results are:

| Radiation Dose, megareps | Ultimate Tensile | Percent Elongation | Tensile Impact, foot-pounds per inch [3] | Brittleness Temperature, °C. |
|---|---|---|---|---|
| 0 | (1) | (1) | (1) | (1) |
| 10 | 244 | 1,064 | 362 | <−80 |
| 25 | 830 | 765 | | <−80 |
| 40 | 719 | 666 | | <−80 |

[1] Too soft to measure.

Carbon black-filled ethylene-ethyl acrylate compositions have greatly improved low-temperature properties after irradiation which are superior even to similarly irradiated carbon black filled polyethylene. This is shown by the following example:

EXAMPLE V

*Comparison of irradiated DYNH carbon black mixtures and irradiated ethylene-ethyl acrylate copolymer-carbon black mixtures*

| | (Polyethylene) DYNH | Ethylene-ethyl acrylate copolymer |
|---|---|---|
| Mole percent acrylate in feed | 0 | 1.0 |
| Percent acrylate | 0 | 20 |
| Melt Index Initially | 2 | 26.5 |
| Parts carbon black per 100 parts resin | 50 | 50 |
| Radiation dose, megareps | 20 | 25 |
| Final Melt Index | (1) | (1) |
| Ultimate Tensile strength, p.s.i. 23° C | 2,400 | 1,020 |
| Percent elongation | 215 | 550 |
| Brittle temperature, °C | −10 | −64 |

[1] Too stiff to measure—basically zero melt index.

Following the process of the present invention it is possible for the first time to obtain ethylene-ethyl acrylate copolymers containing from 5 to 40 percent by weight combined ethyl-acrylate having a melt index below about 0.5 decigram per minute. These copolymers which are illustrated in the five examples could be readily molded and extruded into any desired shape yielding smooth glossy surfaces.

EXAMPLE VI

Three samples of an ethylene-ethyl acrylate copolymer containing about 15 weight percent combined ethyl acrylate and having a melt index of 4.02 decigrams per minute at 190° C., were irradiated in the form of approximately ⅛ inch cube pellets, with a radiation dose of two, four, and six megareps using the equipment for handling pellets described earlier. The belt speed was 20 inches per minute, and the beam current was 250 microamps. The melt index of the first product was 0.735, of the second product was 0.065, and of the third product was zero. The first two products could be molded at temperatures of 110° C–300° C. to give plaques having smooth, glossy surfaces.

EXAMPLE VII

An ethylene-ethyl acrylate copolymer containing about 20 weight percent combined ethyl acrylate, and having a melt index of 26.5 in the form of compression molded plaques, was irradiated with 2 million volt electrons to a dose of 2 megareps, which reduced its melt index to 9.18. A radiation dose of 4 megareps reduced its melt index to 4.96. A dose of 6 megareps reduced the melt index to 0.14. After 8 megareps dose, the melt index was 0.046. The product resulting from a dose of 10 megareps had a zero melt index and was molded or extruded only with difficulty. However, the products resulting from irradiation which had measurable melt indices were easily molded by compression or injection molding to give molded pieces having attractive glossy surfaces of improved transparency compared to pieces from the unirradiated polymer. The tensile strength of the molded pieces increased with increasing radiation dose.

EXAMPLE VIII

Plaques molded from an ethylene-ethyl acrylate copolymer containing about 25 weight percent combined ethyl acrylate and having a melt index of 47.4 were reduced in melt index by irradiation as follows: 2 megareps, 25.2 melt index; 4 megareps, 18.0 melt index; 6 megareps, 8.13 melt index; 8 megareps, 1.92 melt index; 10 megareps, 0.17 melt index; 16 megareps, 0.00 melt index. All of the above products, save the last, could be molded or extruded into useful shapes by compression or injection molding at temperatures below 200° C. The zero melt index samples were molded with difficulty at temperatures above 200° C., and were lacking smooth surfaces.

EXAMPLE IX

A sample of ethylene-ethyl acrylate in the form of cast sheet, containing about 35 percent combined ethyl acrylate, having a melt index of 70.5, was reduced in melt index by treatment with 2 million volt electrons as follows: 2 megareps dose, 30.1 melt index; 6 megareps, 12.2 melt index; 10 megareps, 0.756 melt index; 12 megareps, 0.533 melt index; 14 megareps, 0.0 melt index. All the irradiated samples could be fabricated by molding or extruding to give attractive pieces having greatly improved tensile strengths compared with the control which was of the consistency of putty.

It is also now possible to make ethylene-ethyl acrylate copolymers essentially free from environmental stress cracking (as shown in Examples X and XI) and having superior impact strength to the presently available ethylene-ethyl acrylate copolymers (as shown in Examples I, XII, and XIII).

EXAMPLE X

An ethylene-ethyl acrylate copolymer containing 5–6 percent combined ethyl acrylate and having a melt index of 4.2 was molded into 125 mil thick plaques which were annealed 7 days at 70° C. Other plaques of the same material were irradiated to doses of 5, 10 and 20 megareps and then aged 7 days at 70° C. The plaques were submitted for environmental stress crack resistance tests in Igepal. These results and other properties are tabulated below:

| Radiation dose, megareps | Tensile Strength, p.s.i. | Percent Elongation | Tensile Impact, foot-pounds/inch³ | Brittleness Temperature, ° C. | Stress Crack Resistance Hrs. to Fail |
|---|---|---|---|---|---|
| 0 | 1,895 | 700 | 439 | −80 | 100% failure in 4 hrs. |
| 5 | 2,687 | 720 | 654 | −80 | No failure in 21 days. |
| 10 | 3,079 | 680 | 846 | −80 | Do. |
| 25 | 3,184 | 515 | 1,044 | −80 | Do. |

EXAMPLE XI

A sample of 1.5 mil thick film made, by blown tubular extrusion process, from an ethylene-ethyl acrylate copolymer containing about 10 percent ethyl acrylate and having a melt index of 5 was irradiated with 2 million volt electrons, using a shuttle conveyor to various radiation doses and tested for tensile impact strength. The results were as follows:

| Radiation dose, megareps | Tensile Impact Strength (Foot Pounds/Cubic Inch) | |
|---|---|---|
| | Machine Direction | Transverse Direction |
| 0 | 489 | 736 |
| 10 | 616 | 940 |
| 15 | 667 | 979 |
| 20 | 691 | 1,004 |

The samples which had been irradiated would not dissolve in boiling toluene. The unirradiated resin dissolved easily.

EXAMPLE XII

Polyethylene and an ethylene-ethyl acrylate copolymer were each mixed with carbon black in the proportions of 3 parts resin to 1.5 parts of black. Each blend was compression molded into 40 mil plaques, some of which were irradiated at varying dose from 5 to 25 megareps. Half of the plaques were annealed 7 days at 70° C. in a forced air oven. All of the plaques were subjected to measurements of various physical properties. The results are summarized in the following table:

| Plaques | Radiation dose, Megareps | Percent Elongation | Tensile Impact, ft.-lb./in.³ | Brittleness Temperature, ° C. |
|---|---|---|---|---|
| Polyethylene-DYNH, Melt Index of 2: | | | | |
| Annealed | 5 | 70 | 67 | −26 |
| | 10 | 65 | 75 | −26 |
| | 25 | 175 | 100 | −30 |
| Unannealed | 5 | 105 | 82 | −26 |
| | 10 | 200 | 109 | −28 |
| | 25 | 185 | 156 | −34 |
| Copolymer, 20 percent ethyl acrylate, melt index of 26.5: | | | | |
| Annealed | 5 | 660 | 231 | −64 |
| | 10 | 710 | 268 | −60 |
| | 25 | 660 | 267 | −72 |
| Unannealed | 5 | 485 | 255 | −58 |
| | 10 | 620 | 305 | −58 |
| | 25 | 550 | 302 | −64 |

The dramatic effect of this process is observed on the tensile impact strength secured on the copolymer having 20% combined acrylate. The resulting product has more than twice the impact strength than the polyethylene and a brittleness temperature below −50° C. The high brittleness temperature of the carbon black loaded polyethylene makes it commercially useless for many applications whereas the copolymer is very desirable. In other words, it is not possible to secure a highly elastic, high impact strength, low brittleness temperature resin from carbon filled polyethylene whereas surprisingly, it is possible to secure them from the ethylene-alkyl acrylate copolymers of this invention.

As was previously stated, ethylene-ethyl acrylate copolymers produced in accordance with the present invention may be biaxially oriented to provide films which are greatly improved in optical clarity as shown by higher gloss and lower haze levels and which demonstrate 90° C. shrinkage adequate for poultry shrink packaging. Presently available ethylene-ethyl acrylate copolymers can not be biaxially oriented in a continuous manner at temperatures which will yield the same desired properties and improvements. These improvements are shown in the following two examples (Examples XIII and XIV).

EXAMPLE XIII

A sample of ethylene-ethyl acrylate copolymer in the form of an extruded tubular film 8 mils thick, containing 10 percent acrylate, having a melt index of 4.7 and a density of 0.9205 was given a radiation dose of 5.0 megareps. The final melt index was 0.12. This product was biaxially oriented in a continuous manner at a temperature just below the softening point of the resin to an expansion ratio of 3.3/5. The shrinkage at 90° C. of this film was 18 percent machine direction, 34 percent transverse direction. Its 45 degree gloss was 72 percent and its haze was 2.6%. Unirradiated tubular film of this product could not be biaxially oriented.

EXAMPLE XIV

Polyethylene and three different ethylene-ethyl acrylate copolymers were subjected to ionizing radiation of 25 megareps. Each of the copolymers were irradiated with and without carbon black; the results are shown in the following table:

| Mole percent acrylate in Feed | Melt Index before Irradiation | Optical Density per mil at 13.7 micron | Parts Black/ 100 pts. resin | Percent Set at 100% Elongation after Irradiation |
|---|---|---|---|---|
| 0 | 1.8 | 0.405 | 0 | 100 |
| 0.7 | 4.0 | 0.278 | 0 | 17.5 |
| 0.7 | 4.0 | 0.278 | 33 | 26.0 |
| 1.0 | 26.5 | 0.17 | 0 | 20 |
| 1.0 | 26.5 | 0.17 | 43 | 20 |
| 1.87 | 70 | Nil | 0 | 10.7 |
| 1.87 | 70 | Nil | 43 | 10.5 |

It is to be noted that the disappearance of the 13.7 absorption band which normally indicates crystallinity, on the examples of 1.87 mole percent acrylate (30–35 percent by weight combined ethyl acrylate) is indicative of a rubbery amorphous polymer, and the 10% set after elongation proves that a good rubber is obtained. This is equivalent to natural rubber.

EXAMPLE XV

A sample of ethylene-ethyl acrylate copolymer, having a melt index of 68, containing about 30–35 percent by weight combined ethyl acrylate and being substantially free from crystallinity as demonstrated by the absence of an absorption band at 13.7 microns when this product was analyzed by infrared absorption spectroscopy, was blended at 125° C. in a Banbury mixer with 43 parts furnace type carbon black per 100 parts of resin and compression molded into flat sheets 6 inches by 8 inches by 40 mils thick. This material had an ultimate tensile strength of 330 p.s.i. at 23° C. and an elongation at break of 40 percent. Tensile set at 100 percent elongation could not be determined on this product, since it would elongate only 40 percent, and then took a permanent set. The material was so lacking in tenacity that its low temperature brittleness could not be determined. Other plaques of this same product were irradiated with 2 million volt electrons from a Van de Graaff accelerator by placing the plaques on a shuttle conveyor belt and passing the samples under the electron beam at a speed of 40 inches per minute, at a beam width of 12 inches and a beam current of 250 microamps to a total dose of 25 megareps. The product had a melt index of 0.00, an ultimate tensile strength of 1080 p.s.i. at 23° C., and an elongation of 300 percent with a zero percent tensile set at 100 percent elongation. The 80 percent brittleness temperature of this product was —68° C. The material exhibited the properties of an insoluble, infusible snappy rubber. Regular polyethylene treated in the same manner with the same carbon black loading gives a weak brittle product at 23° C.

EXAMPLE XVI

An ethylene-ethyl acrylate copolymer, containing 25 percent ethyl acrylate, having a melt index of 54, was blended in a Banbury mixer at 125° C. for 10 minutes with 48 parts of furnace type carbon black per 100 parts resin and compression molded into plaques 6 inches by 8 inches by 40 mils thick. Some of these were irradiated to doses of 7, 10 and 25 megareps using the previously described procedure. The physical properties were as follows:

| Dose, Megareps | Ultimate | | Tensile Strength at 100% Elongation | Tensile Set at 100% Elongation | Brittle Temp. 80% (° C.) | Secant Modulus at 1% Elongation, p.s.i. |
|---|---|---|---|---|---|---|
| | Tensile, p.s.i. | Elongation, percent | | | | |
| 0 | 232 | 235 | 222 | 23 | —56 | 2,053 |
| 7 | 441 | 525 | 273 | 22 | —72 | 2,243 |
| 10 | 592 | 395 | 373 | 23 | —64 | 2,048 |
| 25 | 1,600 | 380 | 484 | 17 | —78 | 2,473 |

EXAMPLE XVII

To further show the effect of irradiation on crosslinking of the subject copolymer, an ethylene-ethyl acrylate copolymer, containing 3 to 5 weight percent of combined acrylate, having a melt index of 12, and produced from a feed gas containing 0.22 mole percent ethyl acrylate, was subjected to various radiation doses and the product tested for percent insolubles in boiling toluene. Each of the irradiated products had a zero melt index. The test results are as follows.

Dose, megareps: Percent insoluble in boiling toluene
0 ----------------------------------- Negligible
5 ----------------------------------- 24.6
8 ----------------------------------- 42.0
12 ---------------------------------- 55.9
16 ---------------------------------- 65.1
20 ---------------------------------- 70.6

EXAMPLE XVIII

It has been found that by irradiating ethylene-alkyl acrylate copolymers according to this invention in the form of film a product can be produced which can be biaxially oriented by stretching below the melting point of the polymer sufficient to align the molecules of the polymer without breaking the product being stretched.

An ethylene-ethyl acrylate copolymer containing 10 weight percent combined ethyl acrylate, having a melt index of 4.7 decigrams per minute and a density of 0.9205 gram per cubic centimeter was extruded at 310° F. into a seamless tubular film 8 mils thick with a flat width of 2 inches. The film was irradiated to 4 megareps at ambient temperatures to a final melt index of 0.12 decigram per minute. This film was biaxially oriented at just below its softening point to an oriented film size of 0.3–0.6 mil and a flat width of 10 inches. The machine direction stretch was 3.3/1 and the transverse direction was 5.0/1. After orientation and cooling, the film showed a shrinkage at 90° C. of 18 percent in the machine direction and 34 percent in the transverse direction, and at 100° C. of 64 percent in the machine direction and 73 percent in the transverse direction. Its gloss at an angle of 45 degrees was 72 percent and its haze was 2.6 percent.

The irradiated, biaxially oriented film had a tensile strength in the machine direction of 7915 p.s.i. and in the transverse direction of 8929 p.s.i. It had an elongation at break of 233 percent in the machine direction and 107 percent in the transverse direction. It had a tear strength in 19 grams per mil in the machine direction and 18 grams per mil in the transverse direction. Its oxygen transmission was 672 cc./100 m.$^2$/24 hrs./mil. The film had an impact strength of 23.8 inch pounds per mil and a spectral transmission of 38 inches.

By way of comparison, unirradiated film identical to that specified above could not be continuously biaxially oriented.

The present invention is not limited to ethylene-ethyl acrylate copolymer but also is applicable with other ethylene-alkyl acrylate copolymers. This is shown in the following examples.

EXAMPLE XIX

A sample of ethylene-butyl acrylate copolymer containing 29 weight percent butyl acrylate and having a melt index of 1.3 decigrams per minute, was compression molded into a 10 mil film and subsequently irradiated to a dose of 10 megareps. This irradiated film was tested for tensile strength, secant modulus at 1.0 percent elongation and elongation at break. The results are shown in the table below, along with the properties of the unirradiated copolymer.

| Radiation Dose, megareps | Tensile Strength, p.s.i.g. | Percent Elongation at break | Secant Modulus at 1 percent elongation, p.s.i. |
|---|---|---|---|
| 0 | 1,100 | 690 | 3,740 |
| 10 | 1,700 | 730 | 4,440 |

The unirradiated films disintegrated immediately on immersion in boiling toluene and dissolved completely within 15 minutes. The irradiated films remained intact briefly under the same conditions and did not dissolve completely even on prolonged heating.

EXAMPLE XX

A sample of ethylene-2-ethyl hexyl acrylate copolymer containing 21 weight percent 2-ethyl hexyl acrylate and having a melt index of 8 was compression molded into a 10 mil film and irradiated to a dose of 25 megareps. The results are shown in the following table along with properties of the unirradiated copolymer.

| Radiation Dose, megareps | Tensile Strength, p.s.i.g. | Percent Elongation at break | Secant Modulus at 1 percent elongation, p.s.i. |
|---|---|---|---|
| 0 | 790 | 510 | 4,530 |
| 25 | 860 | 455 | 4,730 |

The unirradiated films disintegrated immediately on immersion in boiling toluene and dissolved completely within 15 minutes. The irradiated film remained intact briefly under the same conditions and did not dissolve completely even on prolonged heating.

EXAMPLE XXI

A sample of the ethylene-2-ethyl hexyl acrylate copolymer of Example XXII was compression molded into a 10 mil film and subsequently irradiated to a dose of 1 megarep. The starting copolymer had a melt index of 8 decigrams per minute, and after irradiation to a dose of 1 megarep it had a melt index of 2.2. A radiation dose of 2 megareps reduced its melt index to 0.61. A dose of 4 megareps reduced the melt index to 0.04. A dose of 8 megareps reduced the melt index to 0.008. The product resulting from a dose of 10 megareps had a zero melt index and was molded or extruded only with difficulty. The irradiated products having measurable melt indices were easily molded by compression or injection molding to give molded pieces having improved transparency compared to pieces molded from unirradiated copolymer.

What is claimed is:

1. A method for producing ethylene-alkyl acrylate copolymers of low melt index which comprises the step of irradiating a normally solid ethylene-alkyl acrylate interpolymer having an initial melt index between 1 and 70 and containing from 5 to 40 weight percent of combined alkyl acrylate and a major amount of combined ethylene with ionizing radiation in an amount from about 0.5 to 50 megareps commensurate with the initial melt index of the copolymer such that the resulting irradiated copolymer has a melt index less than 1.0.

2. A method for producing ethylene-alkyl acrylate copolymers having a melt index less than 1.0 which comprises irradiating a normally solid ethylene-alkyl acrylate interpolymer having a melt index between about 5 and 30 and containing from 5 to 40 weight percent of combined alkyl acrylate and a major amount of combined ethylene with ionizing radiation in an amount from about 1 to 30 megareps commensurate with the initial melt index of the starting copolymer such that the irradiated copolymer has a melt index less than 1.0.

3. A method according to claim 2 wherein the alkyl acrylate is ethyl acrylate.

4. A method for producing rubbery elastomeric ethylene-alkyl acrylate copolymers having melt indices less than 1.0 which comprises irradiating an ethylene-alkyl acrylate interpolymer having an initial melt index between 1 and 70 and containing from 15 to 40 weight percent combined alkyl acrylate and a major amount of combined ethylene with ionizing radiation in an amount between about 1 to 30 megareps commensurate with the initial melt index of the copolymer such that the irradiated copolymer has a melt index less than 1.0.

5. A method according to claim 4 wherein the alkyl acrylate is ethyl acrylate.

6. An irradiated rubbery elastomeric ethylene-alkyl acrylate interpolymer having a melt index less than 1.0 and containing from 15 to 40 weight percent combined alkyl acrylate, and a major amount of combined ethylene and an optical density per mil thickness less than 0.28 at 13.7$\mu$ wave length.

7. An ethylene-alkyl acrylate copolymer of claim 6 wherein the alkyl acrylate is ethyl acrylate.

8. An irradiated carbon-filled rubbery composition containing from 30 to 50 parts of carbon per 100 parts by weight of an ethylene-alkyl acrylate interpolymer having a melt index less than 1.0 and containing from 15 to 40 weight percent combined alkyl acrylate and a major amount of combined ethylene and an optical density per mil thickness less than 0.28 at 13.7$\mu$ wave length.

9. A carbon filled composition of claim 8 wherein the alkyl acrylate is ethyl acrylate.

References Cited by the Examiner

UNITED STATES PATENTS 3,090,770  5/1963  Gregorian _____ 204—154
3,097,150  7/1963  Rainer et al. _____ 204—154

OTHER REFERENCES

Lawton et al.: Nature, vol. 172, pages 76 and 77 (July 11, 1953).

MURRAY TILLMAN, *Primary Examiner.*

JOHN R. SPECK, *Examiner.*

H. S. WILLIAMS, W. L. BASCOMB, N. F. OBLON,
*Assistant Examiners.*

UNITED STATES PATENT OFFICE
CERTIFICATE OF CORRECTION

Patent No. 3,274,086                             September 20, 1966

James E. Potts

It is hereby certified that error appears in the above numbered patent requiring correction and that the said Letters Patent should read as corrected below.

Column 1, line 15, before "inert" insert -- of --; line 33, for "weight", first occurrence, read -- polymer --; column 4, line 18, for "of", second occurrence, read -- to --; column 7, second table, third column, line 1 thereof, for "500" read -- 400 --.

Signed and sealed this 29th day of August 1967.

(SEAL)
Attest:

ERNEST W. SWIDER                          EDWARD J. BRENNER
Attesting Officer                              Commissioner of Patents